United States Patent [19]
De Castro

[11] Patent Number: 5,476,396
[45] Date of Patent: Dec. 19, 1995

[54] AUTOMOTIVE BLADE TYPE FUSE BLOCK TERMINAL ADAPTER

[75] Inventor: Andre A. De Castro, New York, N.Y.

[73] Assignee: No Jack Corporation, Westbury, N.Y.

[21] Appl. No.: 265,401

[22] Filed: Jun. 24, 1994

Related U.S. Application Data

[63] Continuation-in-part of Ser. No. 26,585, Mar. 5, 1993, Pat. No. 5,324,214.

[51] Int. Cl.⁶ .................................................. H01R 19/04
[52] U.S. Cl. ............................................ 439/692; 439/621
[58] Field of Search .................................... 439/621, 622, 439/638, 651, 655, 692–697, 606

[56] References Cited

U.S. PATENT DOCUMENTS

| | | | |
|---|---|---|---|
| 2,866,172 | 12/1958 | Sapper et al. | 439/826 |
| 3,086,251 | 4/1963 | Bernat | 439/695 |
| 3,126,242 | 3/1964 | Herman | 439/682 |
| 3,787,798 | 1/1974 | Carissimi et al. | 439/694 |
| 3,855,569 | 12/1974 | Tymkewicz | 439/695 |
| 4,194,805 | 3/1980 | Ayer et al. | 439/696 |
| 4,826,443 | 5/1989 | Lockard | 439/606 |
| 4,846,733 | 7/1989 | Baisz et al. | 439/622 |
| 4,884,050 | 11/1989 | Kozel | 439/621 |
| 5,125,855 | 6/1992 | Brooks | 439/622 |
| 5,183,420 | 2/1993 | Hollander et al. | 439/695 |

FOREIGN PATENT DOCUMENTS

| | | | |
|---|---|---|---|
| 1437480 | 10/1968 | Germany | 439/692 |
| 1465264 | 5/1969 | Germany | 439/696 |
| 1490666 | 9/1969 | Germany | 439/692 |
| 2056189 | 3/1981 | United Kingdom | 439/692 |

Primary Examiner—Gary F. Paumen
Attorney, Agent, or Firm—Florence U. Reynolds

[57] ABSTRACT

An electrical adapter includes a housing block made of electrically insulating material and a pair of spaced, parallel, electrically conducting blade terminals embedded in the housing block. The first ends of the blade terminals engage contact elements in an automotive fuse block or panel and the second ends, which are either freely accessible within, or extend from, the housing block, engage the electrical connectors of an auxiliary device.

10 Claims, 6 Drawing Sheets

AUTOMOTIVE BLADE TYPE FUSE BLOCK TERMINAL ADAPTER

CROSS REFERENCE TO RELATED APPLICATION

This application is a continuation-in-part application of application Ser. No. 08/026585, filed Mar. 5, 1993, now U.S. Pat. No. 5,324,214, issued Jun. 28, 1994.

BACKGROUND OF THE INVENTION

1. Field of the Invention

This invention is directed to an electrical adapter to provide an electrical connection to an automotive fuse block terminal with the intent of facilitating the connection of a remote auxiliary device which could be used to interrupt, monitor or draw electrical power from a particular circuit in the fuse block. This is accomplished by removing the protecting blade type fuse from its terminal socket in the fuse block and placing the blade type fuse block terminal adapter in its place and connecting an auxiliary device to the adapter. The device can then be used to accomplish one or more of the above-mentioned applications. A protective fuse or fuse-like system must be housed in the connected device or somewhere else in the circuit to protect against electrical irregularities.

2. Description of Prior Art

The automotive as well as other industries have uniformly begun to utilize blade type fuses and fuse blocks that reduce the complexity and problems associated with replacing, as well as monitoring glass cylindrical type fuses, traditionally used in protecting against electrical overloads and overheating in low amperage electrical wiring. The now widely used blade type fuse blocks have economized space due to the compact design of the blade fuses. This fuse housing design permits ease of manipulation and verification of failed fuses in conditions of overloaded or overheated wiring. Examples of blade type fuses and fuse blocks are disclosed in U.S. Pat. No. 3,909,767 and D321,683.

In related inventions, U.S. Pat. Nos. 4,884,050 and 4,986,767 to Emmitt L. Kozel, the issues of fuse element monitoring as well as ease of installation of auxiliary devices were addressed with the blade terminal tap fuse invention and the blade fuse power tap. The first invention, U.S. Pat. No. 4,884,050 in 1989, used one or both blade elements that protruded through the housing (identical in performance as well as appearance) allowing an electrical connection to an auxiliary device. This connection permitted a remote auxiliary device to monitor the fuse element for a failed condition due to an overload in the circuit. It also enabled the quick tapping of electrical power through the same protruding blade elements mentioned above. The later invention, U.S. Pat. No. 4,986,767, also made it possible to tap electrical power as monitor a blade type fuse element, only this time reproducing a fuse-like housing and replacing a fuse in the fuse block with it was no longer necessary. Instead a smaller and less involved tapping apparatus, which could connect directly to the top of an existing fuse, was used.

The invention did simplify both tapping electrical power from a motor vehicle's electrical system as well as enabling remote monitoring of the condition of a fuse element.

Unfortunately, both of the above-mentioned inventions are limited by the presence of a fuse during operation of the system. The use of fuse housing which contains an amperage-sensitive element linking the blade terminals makes it impossible or unnecessary in applications where the working of a fuse interferes with the intent to interrupt a particular electrical circuit by placing a device between such circuit and its fuse. In addition, if a special terminal was to be provided for the purposes of monitoring one or more of the electrical systems for such occurrences as voltage irregularities or strictly tapping electrical power, a fuse-like housing would not be needed but instead an adapter with no fuse element would suffice.

SUMMARY OF THE INVENTION

The blade type fuse block terminal adapter according to the invention has a fuse-like housing with blade type elements for insertion in place of a fuse in the fuse block terminal but it has no amperage-sensitive link between the blade type elements. This enables the adapter to perform the preferred application of the invention, which is to permit the connection of a circuit-interrupting device, such as a motor vehicle security system, between the circuit and its fuse.

The adapter according to the invention comprises an electrically insulating material forming a housing block, and a pair of unconnected, spaced, substantially parallel, electrically conducting blade type elements embedded in said housing block, said blade type elements always being electrically insulated from each other within said housing block, each of said blade type elements having (1) a first end shaped to fit a terminal in said fuse block which normally receives one connector of a blade type fuse and (2) a second end adapted to connect to a terminal of an auxiliary electrical device.

In one embodiment of the invention, both of the secondary (second) ends of the blade type elements on the adapter extend past the housing so that an electrical connection can be made with a pair of female connectors mounted onto or connected by an electrical wire or cable associated with the monitoring device or auxiliary equipment being installed. In this form of the invention, the blade type elements that would be exposed for connection with an auxiliary device, could be protected against arcing or accidental grounding by selectively covering with a protective insulated cap when not being used.

In a second form of this invention, the secondary ends of both blade type elements are mounted within a bore in the housing of the adapter, the bore being of sufficient size to permit two female connectors to be inserted therein in surrounding relationship with the secondary ends of the blade type elements. Here again, to prevent any accidental grounding of the secondary blade type elements, a plug may be inserted within the bore in the housing when the secondary blade type elements are not in use.

Another way to avoid possible shock hazard from unprotected secondary ends when the primary ends of the blade type elements are inserted in the fuse block, is to solder each of the secondary ends to a wire directly connected to the terminal of the auxiliary device.

In still another embodiment of the invention, the adapter features a 90 degree angle design that enables the upper portion of the housing to be inserted into a blade terminal with great ease as well as permitting the closing of the fuse box lid.

The specific design of the blade type elements of the adapter according to the invention depends upon the type of fuse block used. The configuration of the primary (first) ends of the blade type elements of the adapter imitate the configuration of the blade type elements of the fuse it replaces in the automotive fuse block.

5,476,396

The early blade type fuses have coplanar blades which fit into female sockets in the fuse block. Included in this type of fuses are the MINI fuse and the MAXI fuse. The MINI fuses, described in U.S. Pat. Nos. 4,661,793 and 4,604,602, are gaining in popularity due to their smaller design enabling the placement of more fuses in the same space as previous fuses.

The MAXI fuses, described in U.S. Pat. Nos. 4,635,023 and 4,604,602 are also gaining in popularity due to their larger design, enabling the protection of more systems generating higher current loads on one fuse as well as large systems which were once unable to be protected by blade type fuses.

The more recently developed PAL type fuses have either male or female blade type elements lying in planes which are usually at right angles to each other and they engage female of male terminals, respectively, in the fuse block.

DETAILED DESCRIPTION OF PREFERRED EMBODIMENTS

Figure 1:
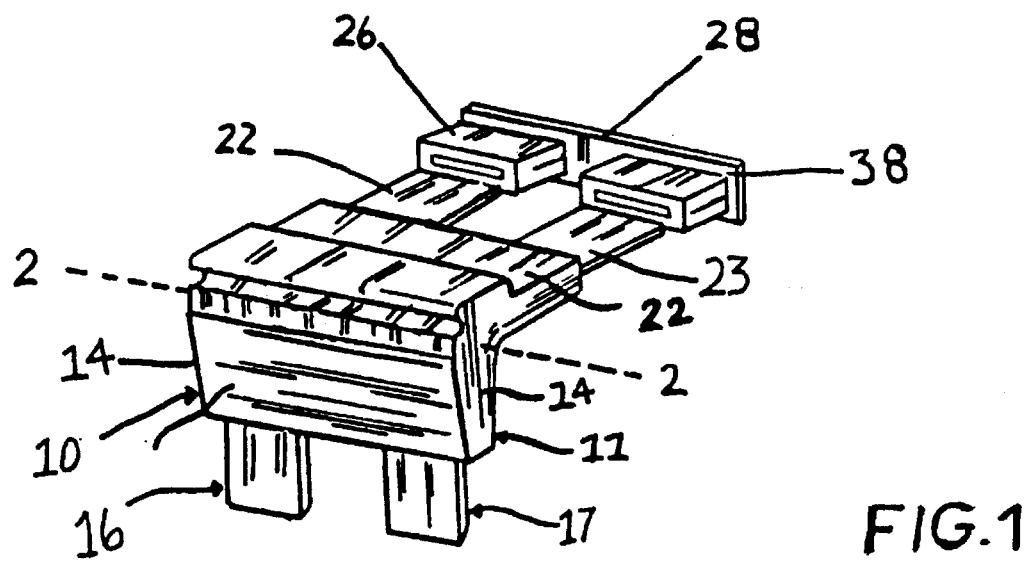
FIG. 1 is a perspective view of one embodiment of the present invention showing an electrically insulated cap for covering the secondary ends of the blade type elements when not in use.
Figure 2:
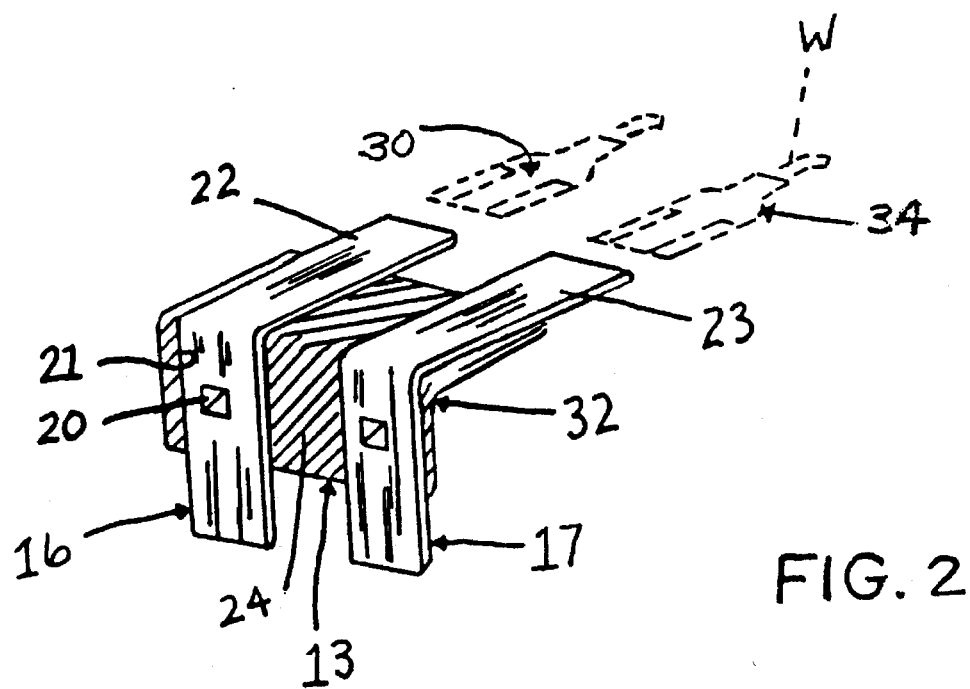
FIG. 2 is A cross-sectional view taken through line 2—2 of FIG. 1 and showing in dotted lines two electrical connectors being brought in overlapping relationship with respect to the secondary ends of the blade type elements of the adapter.

FIGS. 1 and 2 show a first embodiment of the present invention. In this embodiment, the fuse block adapter is designed to provide a quick connection for an auxiliary electrical line or wire W such as shown in dotted lines in FIG. 2. The wire may extend to an electrical component or unit which is to be connected to the electrical system.

As previously discussed, it is the primary intent of the present invention to provide a means to interrupt electrical power to a particular system by coming between the blade type fuse block terminal and the fuse used to protect that automotive system. The actual interrupting of the electrical circuit is accomplished with a remote device, and the adapter only assists such a device in the electrical connection procedure that would otherwise be complicated and time consuming, utilizing splicing wiring and using harnesses. When it is desired to install an auxiliary electrical component such as a telephone or radio in a car, it is necessary to connect such components directly to the vehicle's electrical system. By utilizing the fuse block adapter shown in FIGS. 1 and 2, it is possible to accomplish the connection directly through the fuse block terminals in the cars. In this embodiment the adapter includes an insulating plastic housing 11, having an upper end 12, a lower end 13, side walls 14, and front and rear walls 15. The housing 11 is formed of a suitable electrically insulating plastic material which may be molded about the remaining electrical components of the adapter. Such plastic materials are fire resistant and may include nylon, polystyrenes and the like.

The blade type fuse block terminal adapter include a pair of electrically conductive blade type elements 16 and 17 that are designed to be engaged within a female terminal in a fuse block or panel (not shown). Each of the blade elements 16 and 17 includes an opening generally indicated at 20. The plastic material 24 forming the housing is forced through the openings during molding thereby securing the blade type elements 16 and 17 to the housing 24. The blade type element 16 is shown as extending through a channel 21 having openings along the upper and lower surfaces of the housing. The blade type elements 16 17 include upper extending secondary end portions 22 and 23 which are designed to provide an electrical tap for the electric wire W.

The Secondary ends 22 and 23 of the blade type terminals 16 and 17 extend over and beyond the upper half of the housing 24 that forms a 90 degree angle 32 at the center as part of the adapter design. The two blade type elements 16 and 17 are separated by an electrically insulating wall 24 which is provided to prevent any arcing between the blade type elements.

When the adapter 10 of the present invention is not in use, a separately electrically insulated cover or cap 26 is provided which fits over and closely engages the secondary portions 22 and 23 of the blade type elements 16 and 17. The cover or cap 26 includes a main body portion 38 having an opening which is of a size to cooperatively receive the secondary ends 22 and 23 of blade elements 16 and 17. The body portion 38 also engages the upper end 12 of the fuse block adapter when place over the secondary ends 22 and 23 of the blade type elements 16 and 17. The cover further includes an outwardly extending flange 28 which may be engaged by a screw driver or a fingernail to-lift the cover from the blade type elements 22 and 23.

With the cover removed, the blade type fuse block terminal adapter of the present invention is ready to be utilized to provide a source into the electrical circuit between the fuse block terminal and the fuse it replaces. Once connected the fuse block adapter allows a circuit interruption device to be electrically connected to it through the secondary blade terminal ends. The device connected to the fuse block adapter may also act as an electrical voltage monitor or simply be tapping or sharing electrical power from such a circuit.

As shown in FIG. 2, the crimpable connector elements 30 and 34 are attached to the free ends of the electrical wires W. By placing the crimpable connectors on the secondary ends 22 and 23 of the blade type elements 16 and 17, an electrical contact is established through the electrical wires W to a remote electrical device (not shown).

Figure 3:
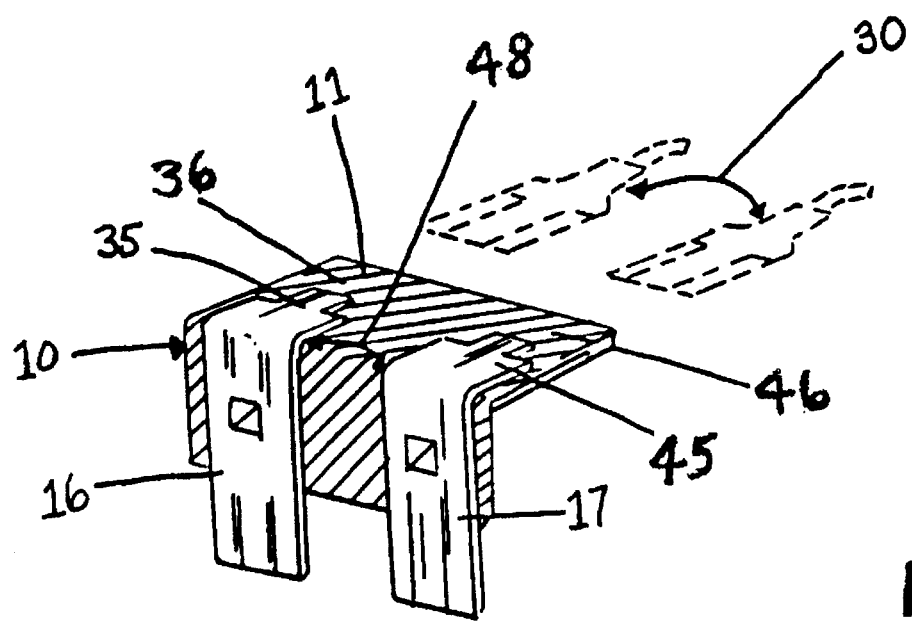
FIG. 3 is a cross-sectional view similar to that of FIG. 2 taken through an alternative embodiment of the present invention where the secondary ends of the blade type elements are oriented within the adapter housing and showing in dotted lines two auxiliary connectors being brought into aligned relationship to make the electrical connection.
Figure 4:
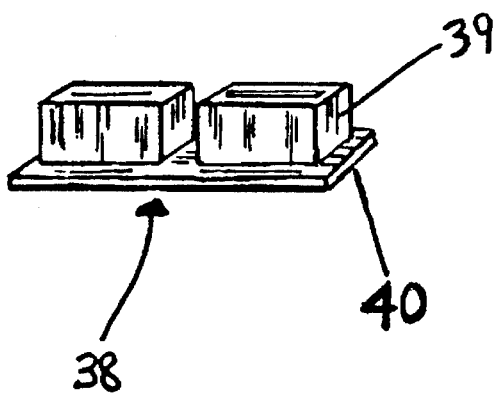
FIG. 4 is a perspective view of an insulated cap which fits into the opening of the adapter of FIG. 3 to electrically insulate the secondary terminals when not in use.

With specific reference to FIG. 3, a second embodiment of the invention is disclosed. In this form the blade type fuse block terminal adapter 10 includes a housing 11 which is substantially identical to the housing shown and discussed above with respect to the embodiment of FIGS. 1 and 2. The only difference between the two housings is that the channel 48 (not illustrated) in which the secondary ends 22 and 23 of the blade type elements 16 and 17 are located, includes bores 36 and 46 (not illustrated) along the uppermost end of the housing after it angles 90 degrees. The bores 36 and 46 are of a size to permit a female electrical connector 30 to be inserted therein to contact the secondary ends 35 and 45 of the blade type elements 16 and 17, which are thus positioned entirely within the electrically insulating housing. When electrical contact is desired, the female electrical connectors are inserted within the bores in the housing as opposed to being inserted over the contact blade type element outside of the housing, as was the case with the prior embodiment.

When the electrical contact elements 35 and 45 are not in use, an electrically insulated coveyor cap 38 is provided which includes two rectilinear sleeves 39 of a size to fit over the electrical contact elements 35 and 45 and cooperatively seated within the bores 36 and 46 (not illustrated). The cover 38 includes an outwardly extending flange portion 40 that provides a gripping surface for removing the cover from the secondary ends 35 and 45 of the blade type elements 16 and 17.

Figure 5:
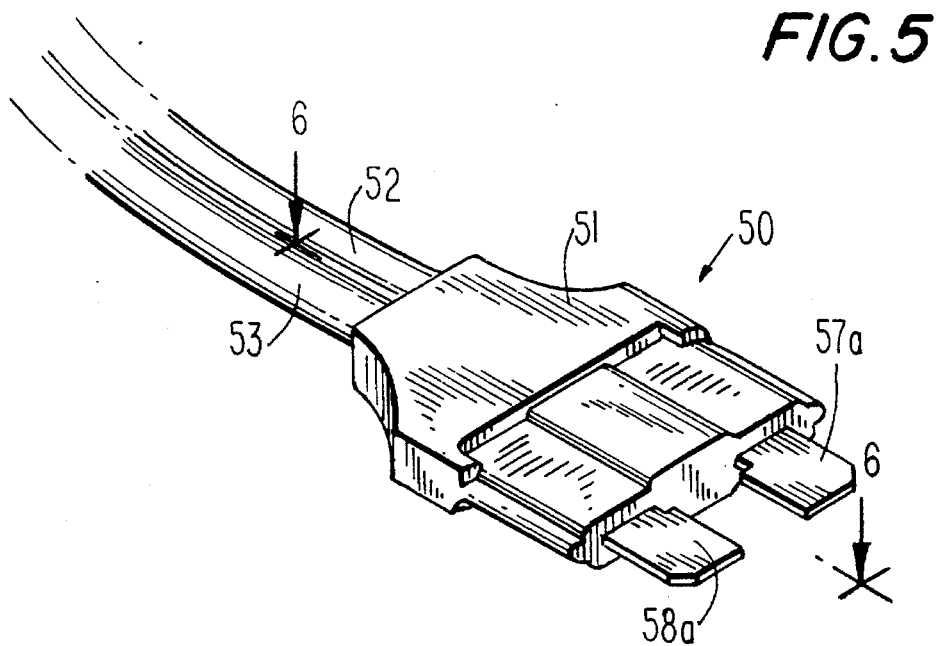
FIG. 5 is a perspective view of a third embodiment of the invention showing wires connected to the secondary ends of the blade type elements of the adapter for ultimate connection to the terminals of the auxiliary device.
Figure 6:
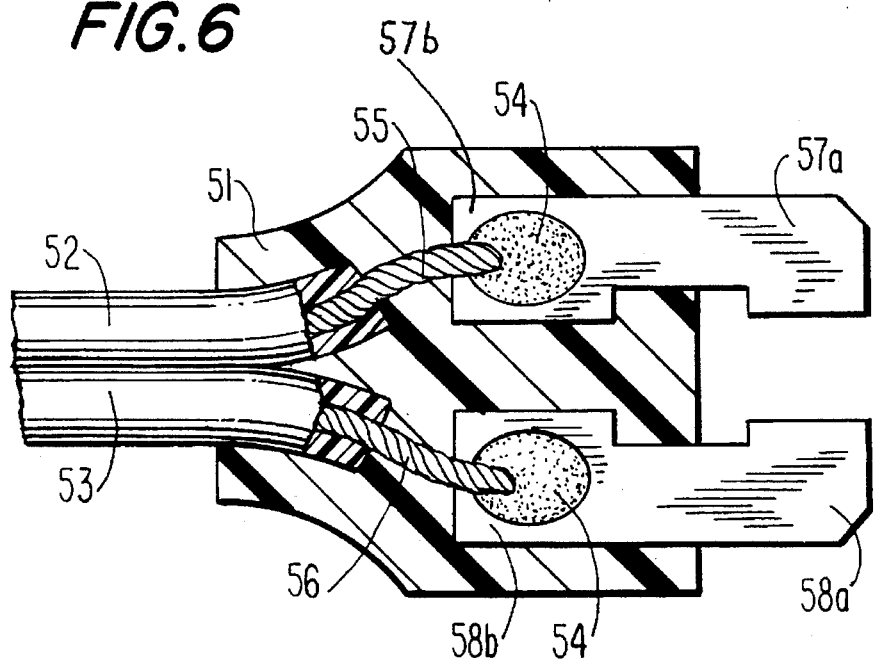
FIG. 6 is a cross-sectional view taken along line 6—6 of FIG. 5.

FIGS. 5 and 6 illustrate a third embodiment 50 of the adapter of the invention in which a plastic housing 51 covers blade type elements having projecting ends 57a and 58a and covered ends 57b and 58b, which are each connected to wires 55 and 56, respectively, by means of solder 54. The wires 55 and 56 are protected by electrically insulated sheaths, 52 and 53, respectively.

Figure 7:
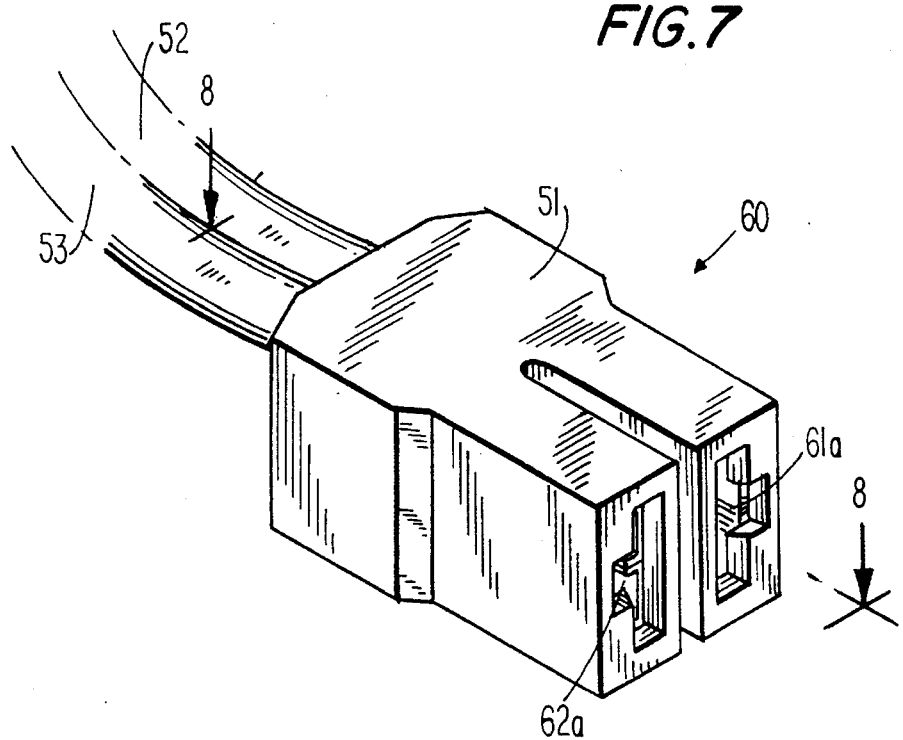
FIG. 7 is a perspective view of a fourth embodiment of the invention which fits into a female PAL fuse block.
Figure 8:
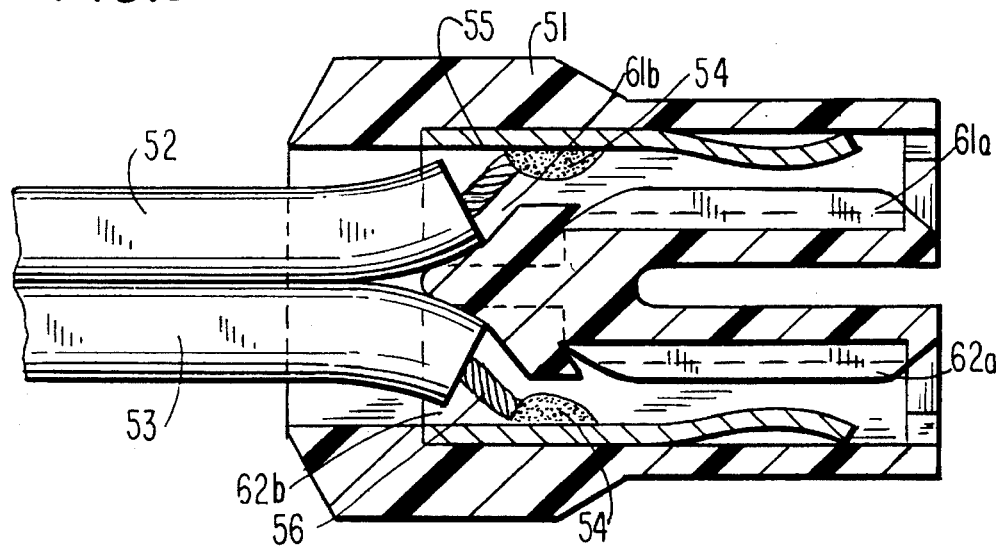
FIG. 8 is a cross-sectional view taken along line 8—8 of FIG. 7.

FIGS. 7 and 8 illustrate a fourth embodiment 60 of the adapter of the invention which fits into a fuse block whose terminals are adapted to receive a female PAL type fuse. Here the blade type elements with ends 61a, 61b and 62a, 62b are completely enclosed by the plastic housing 51 and form hollow female connectors to fit the male connectors (not shown) in the fuse block. The ends 61b and 62b are soldered to wires in the same manner as in FIGS. 5 and 6.

Figure 9:
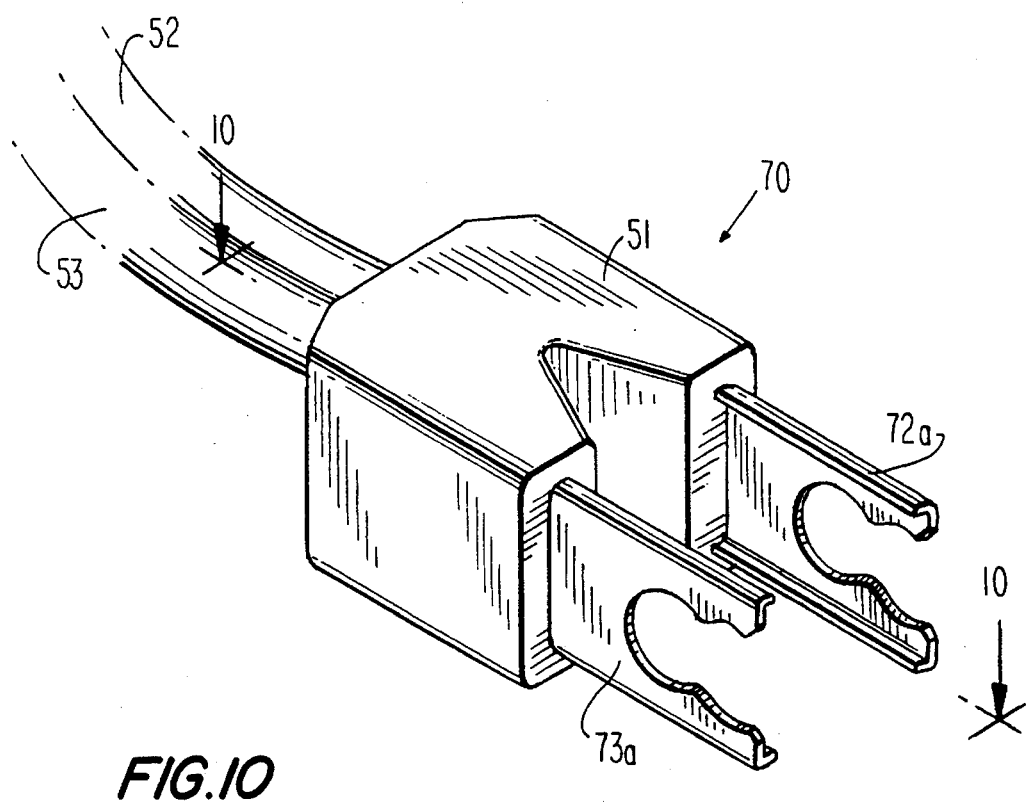
FIG. 9 is a perspective view of a fifth embodiment of the invention which fits into a straight male PAL fuse block.
Figure 10:
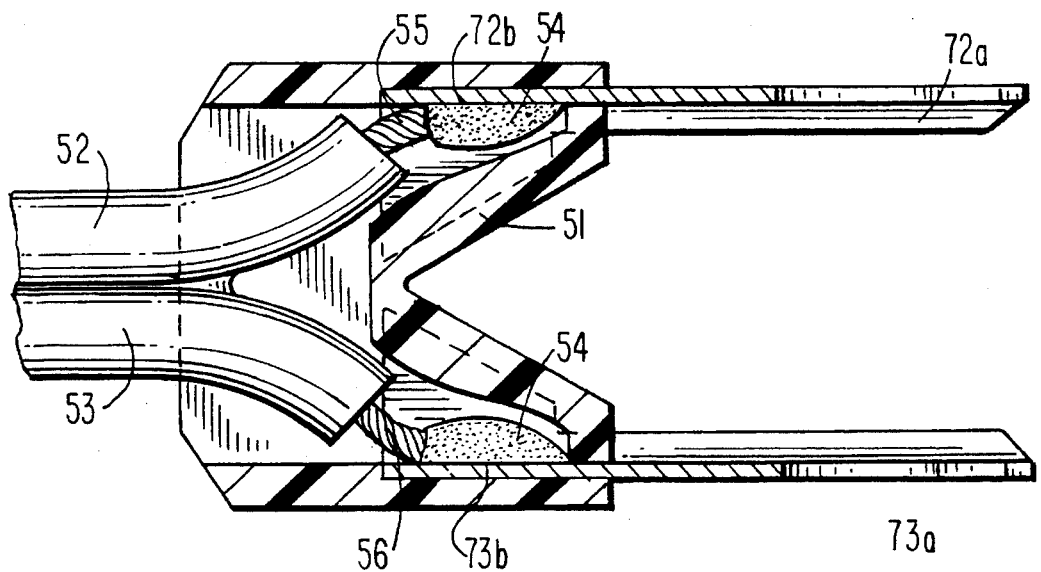
FIG. 10 is a cross-sectional view taken along line 10—10 of FIG. 9.
Figure 11:
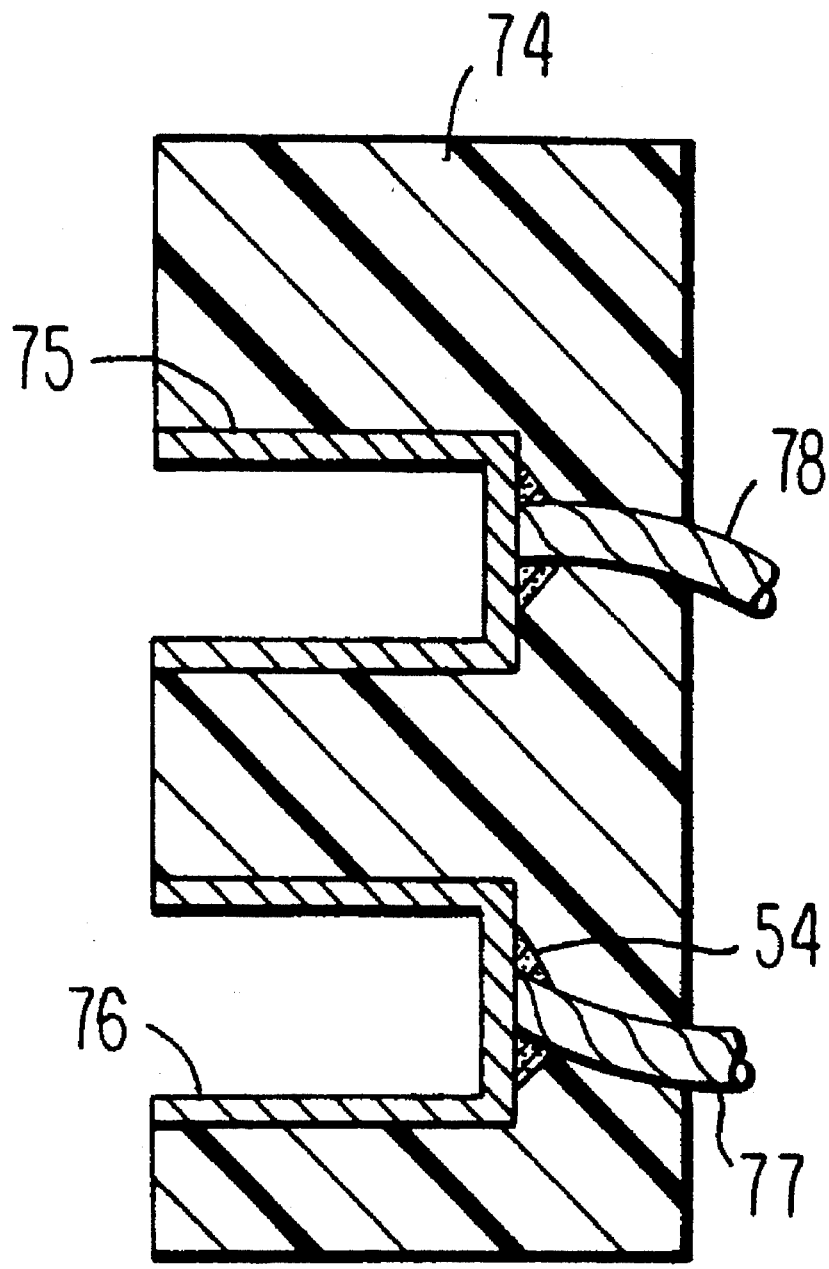
FIG. 11 is a cross-sectional view of an automotive fuse block.

FIGS. 9 and 10 illustrate a fifth embodiment 70 of the adapter of the invention having projecting ends 72a and 72b which fit into a fuse block whose terminals are adapted to receive a straight male PAL type fuse. The other ends 72b and and 73b of the blade type elements are soldered to wires in the same manner as in FIGS. 5 and 6. FIG. 11 illustrates a fuse block 74 having terminal sockets adapted to fit the projecting ends 57a and 58a of the adapter of FIGS. 5 and 6. The sockets have conducting elements 75 and 76, which contact ends 57a and 58a when the adapter is plugged into the fuse block. The conducting elements 75 and 76 are connected by solder 54 to wires 77 and 78, respectively, which are integral with the electrical system of a motor vehicle.

The blade type fuse block terminal adapter of the present invention is utilized in place of a blade fuse. The adapter is installed in the same manner as a blade fuse. However, when connected it does not perform the function of a fuse, but is only a way to quickly enable tapping into an electrical circuit with the goals of interrupting such circuit, tapping electrical power from such circuit or monitoring electricity in such circuit by then allowing connection by the appropriate device. The installed device must then protect the circuit with a fuse or fuse-like system. In the event that a manufacturer provides an additional dedicated terminal socket in its fuse block, the adapter according to the invention can then be the link between that terminal and an electrical device or monitoring devices which no longer need to be professionally wired in. On the other hand, the adapter may be permanently wired by the distributor to the auxiliary device, which then can be easily plugged into the fuse block with no shock hazard. The embodiments 50, 60, and 70 may be wired in this way.

It is understood that other modifications of the adapter according to the invention may be made without departing from the scope of the invention as defined in the claims.

I claim:

1. An electrical adapter for insertion into the terminals of an automotive fuse block instead of a blade type fuse, comprising an electrically insulating material forming a housing block, and only two unconnected, spaced, substantially parallel, flat, coplanar electrically conducting blade type elements molded into said housing block, said blade type elements always being electrically insulated from each other within said housing block, each of said blade type elements having (1) a first end protruding from said housing block and shaped to be received in a terminal of said fuse block which normally receives one blade of a blade type fuse and (2) a second end connected to one end of a conductor wire, the other end of the wire being adapted to attach to a terminal of an auxiliary electrical device, the connected end of the wire being molded into said housing block.

2. The adapter as claimed in claim 1, wherein said material is a plastic material which completely fills the space between said blade type elements within the housing block.

3. The adapter as claimed in claim 1, wherein said elements are of the MINI fuse type.

4. The adapter as claimed in claim 1, wherein said elements are of the MAXI fuse type.

5. In an automotive electrical system having a fuse block provided with terminals adapted to receive a blade type fuse and an adapter inserted in the terminals of said fuse block for connecting an auxiliary electrical device into said electrical system, the improvement wherein said adapter comprises an electrically insulating material forming a housing block and only two unconnected, spaced, substantially parallel, flat, coplanar electrically conducting blade type elements molded into said housing block, said blade type elements always being electrically insulated from each other within said housing block, each of said blade type elements having (1) a first end protruding from said housing block and received in the corresponding terminal in said fuse block which normally receives one blade of a blade type fuse and (2) a second end connected to one end of a conductor wire molded into said housing block, the other end of the wire being attached to a terminal of an auxiliary electrical device, thereby providing a source of power to said auxiliary electrical device, and wherein said electrical system includes a fuse external to the adapter to protect said electrical system from a current overload.

6. The electrical system as claimed in claim 5, wherein said auxiliary device is a motor vehicle security system.

7. The electrical system as claimed in claim 5, wherein said auxiliary device is a radio.

8. The electrical system as claimed in claim 5, wherein said auxiliary device is a telephone.

9. The electrical system as claimed in claim 5, wherein said fuse block is adapted to receive a MINI blade type fuse.

10. The electrical system as claimed in claim 5, wherein said fuse block is adapted to receive a MAXI blade type fuse.

* * * * *